United States Patent [19]
Takao et al.

[11] 3,982,981
[45] Sept. 28, 1976

[54] UNITARY HONEYCOMB STRUCTURE AND METHOD OF MAKING IT

[75] Inventors: Hiroshi Takao, Yokosuka; Kinmochi Togawa, Tokyo; Kazuo Matoba, Yokohama, all of Japan

[73] Assignee: Nissan Motor Co., Ltd., Yokahama, Japan

[22] Filed: Dec. 6, 1973

[21] Appl. No.: 422,155

[30] Foreign Application Priority Data
Dec. 7, 1972  Japan.............................. 47-122810

[52] U.S. Cl.................................. 156/89; 156/205; 428/116; 428/178; 428/184; 23/288 R; 165/10; 165/166
[51] Int. Cl.². ...................... B31F 1/20; B32B 3/12; C04B 37/00; F28D 17/02
[58] Field of Search ............................ 161/68–69, 161/127; 23/288 R, 288 FC; 165/166; 156/197, 89; 428/116, 178, 184

[56] References Cited
UNITED STATES PATENTS

| | | | |
|---|---|---|---|
| 3,088,271 | 5/1963 | Smith......................... | 23/288 FC X |
| 3,112,184 | 11/1963 | Hollenbach...................... | 161/68 X |
| 3,205,109 | 9/1965 | Schudel .......................... | 156/197 |
| 3,232,865 | 2/1966 | Quinn et al........................ | 210/11 |
| 3,251,403 | 5/1966 | Smith.................................. | 165/10 |
| 3,274,048 | 9/1966 | Armour et al. ..................... | 161/184 |
| 3,320,044 | 5/1967 | Cole et al. ...................... | 156/205 X |
| 3,502,596 | 3/1970 | Sowards........................... | 161/68 X |
| 3,692,497 | 9/1972 | Keith et al. ....................... | 23/288 R |
| 3,754,870 | 8/1973 | Carnahan et al. ............. | 23/288 FC |

*Primary Examiner*—Philip Dier

[57] ABSTRACT

A plurality of corrugated sheets are fixedly superimposed one on another so that the axes of the corrugations of one sheet are not parallel to those at adjacent sheets.

9 Claims, 4 Drawing Figures

UNITARY HONEYCOMB STRUCTURE AND METHOD OF MAKING IT

The present invention relates to a relatively small honeycomb structure with numerous thin-walled passageways and to a method of making it.

In general, it is well known to utilize a honeycomb structure in a heat exchanger for a gas turbine engine, as a catalytic carrier in a catalytic converter for an automotive exhaust system, or for filtering various fluids. Various honeycomb structures have heretofore been proposed, such as that disclosed in U.S. Pat. No. 3,444,925 entitled "Structural Articles and Method of Making". In this prior art, the honeycomb structure has a plurality of corrugated sheets and flat sheets of same material as the corrugated sheet. The corrugated and flat sheets are alternately superimposed one on another to define a plurality of fluid passageways between adjacent sheets.

If this honeycomb structure is used in a heat exchanger or a catalytic converter, fluid flows straight through the fluid passageways between the corrugations of the corrugated sheets. This flow mode provides relatively low efficiency because the fluid contacts a relatively small internal surface area of the structure.

It is accordingly, an important object of this invention to provide an improved unitary honeycomb structure which has fluid passageways communicating with each other in which turbulent fluid flow is produced and in which the fluid contacts a relatively larger internal surface of the structure.

It is another important object of this invention to provide a method of making an improved unitary honeycomb structure as described above.

These and other objects and features of the present invention will become more apparent from the following description when taken in conjunction with accompanying drawing, in which.

Figures 2A, 2B:
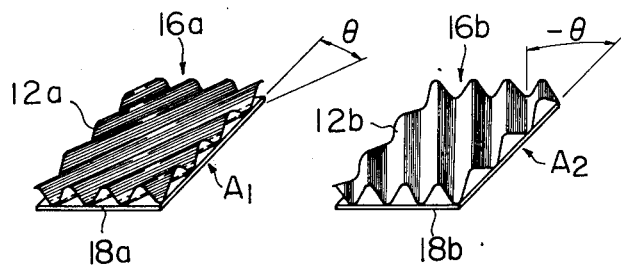
FIG. 2a is a fragmentary perspective view of a part of the unitary honeycomb structure shown in FIG. 1.
FIG. 2b is a fragmentary perspective view of another part of the unitary honeycomb structure shown in FIG. 1 according to this invention.
Figure 3:
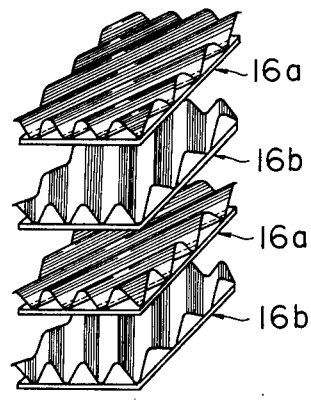

FIG. 3 is an exploded view showing the alignment of units 16a and 16b shown in FIGS. 2a and 2b.

Figure 1:
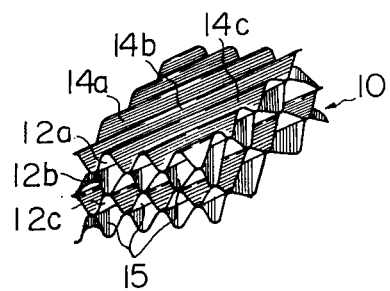
FIG. 1 is a fragmentary perspective view of an embodiment of a unitary honeycomb structure according to this invention.

Referring now to FIG. 1, a unitary honeycomb structure 10 is shown as comprising a plurality of corrugated sheets 12a, 12b, and 12c. These corrugated sheets have a plurality of preferably straight corrugations 14a, 14b, and 14c. The axes of adjacent corrugations of each corrugated sheet are parallel to and equidistant from each other. In addition, the axes of the corrugations of adjacent corrugated sheets are oriented at a predetermined angle to each other. The corrugations, 14a, 14b, and 14c of the sheets 12a, 12b and 12c may have the same or different profiles. The honeycomb structure 10 may be formed of a ceramic and/or a metal.

The corrugated sheets are fixedly superimposed one on another so that the axes of the corrugations of one sheet are oriented at the predetermined angle with respect to the axes of the corrugations of adjacent corrugated sheets to form the unitary honeycomb structure 10. A plurality of fluid passageways 15 defined by adjacent corrugated sheets are in communication with each other due to the inherent arrangement of the corrugated sheets. This is advantageous especially when the honeycomb structure is used in a catalytic converter for an automotive exhaust system or a heat exchanger for a gas turbine engine in that fluid contacts a relatively larger internal surface area of the corrugated sheets.

A preferred method of making the structure is as follows. First, flexible sheets are prepared which contain a pulverized ceramic material. A ceramic material such as cordierite, chamotte, alumina, and silica are finely pulverized and suspended with organic fibers in a liquid such as water. The organic fibers may be formed of wood, hemp, paper, mulberry, etc., or organic synthetic fibers. The suspension is treated, for example, by a Fourdrinier paper making machine into flexible sheets containing the ceramic material and the organic fibers. The resultant flexible sheets are thereafter corrugated by a known corrugating machine. The corrugated sheets used in this invention may preferably have a thickness of 0.25 to 0.45 mm amd a width of 200 mm.

The flexible corrugated sheets are then superimposed one on another and bonded together with an adhesive to form the unitary honeycomb structure 10. External surfaces of ridges of the corrugations on both sides of the corrugated sheets may be coated with the adhesive, which may be polyvinyl acetate, polyvinyl alcohol, polyvinyl acetal, or polyacrylate. The adhesive may contain the same ceramic material used in the corrugated sheets to increase the bonding strength between adjacent corrugated sheets. Referring to FIGS. 2a and 2b, cleanly burnable combustible organic support sheets 18a and 18b may be adhered to the corrugated sheets 12a and 12b respectively to form units 16a and 16b. The sheets 18a and 18b may be formed of paper containing flax fibers or a synthetic resin such as polyethylene, and preferably have a thickness of 0.1 mm and a width of 200 mm. The units 16a and 16b may be cut to a predetermined size, such as 200 mm long and 200 mm wide. An angle $\theta$ between the longitudinal axes of the corrugations 14a of the corrugated sheet 12a and one edge $A_1$ is selected. A similar angle $-\theta$ between the corrugations 14b and an edge $A_2$ is selected so that predetermined angle mentioned above has the magnitude $2\theta$.

Units similar to 16a and 16b are alternately superimposed one on another and fixed together using the adhesive. Thus, the angle $2\theta$ is provided between corrugations of adjacent units.

The assembled structure is then heated for example, in an electric furnace at a predetermined temperature of 1300°C. During this step, the support sheets are clearly disintegrate and the corrugated sheets are sintered and fused together to form the finished structure 10 the axes of the corrugations of one corrugated sheet are oriented at a predetermined angle to the axes of the corrugations of each adjacent corrugated sheet as shown in FIG. 1. It will be understood that the burnable support sheets 18a and 18b function to prevent the adjacent corrugations of the adjacent two corrugated sheets having plasticity from being damaged and being squashed due to the weight of the corrugated sheets.

The unitary honeycomb structure 10 may be cut into any desired shape such as rectangular or cylinder in a suitable manner such as by sawing. It should be noted that openings of passageways 15 at locations other than inlet and outlet ends (not designated) of the structure 10 should be suitably blocked such as by alumina cement.

What is claimed is:

1. A method of forming a unitary honeycomb structure composed of plurality of corrugated sheets fixedly superimposed one on another so that the axis of the corrugations of one sheet are oriented at a predetermined angle to the axes of the corrugations of each adjacent sheet, comprising the steps of:

preparing a plurality of flexible corrugated sheets formed of ceramic material and plurality of burnable support sheets of organic material;

superimposing alternately each of said flexible corrugated sheets and each of said burnable support sheets in succession so that the axes of the corrugations of one corrugated sheet are oriented at the predetermined angle to the axes of the corrugations of each adjacent corrugated sheet for thereby forming a flexible assembled structure; and heating said flexible assembled structure at a temperature that will disintegrate said plurality of support sheets and sinter and fuse said plurality of corrugated sheets together to form a unitary honeycomb structure.

2. A method as claimed in claim 1, further comprising the step of coating adhesive on the ridges of the corrugations of said plurality of flexible corrugated sheets to be performed prior to said superimposing step.

3. A method as claimed in claim 2, in which said adhesive is selected from the group consisting of polyvinyl acetate, polyvinyl alcohol, polyvinyl acetal and polyacrylate.

4. A method as claimed in claim 2, in which said adhesive contains said ceramic material.

5. A method as claimed in claim 1, in which said support sheet is selected from a group consisting of a paper containing flax fibers or a synthetic resin.

6. A method of forming a unitary honeycomb structure composed of plurality of corrugated sheets fixedly superimposed one on another so that the axes of the corrugations of one sheet are oriented at a predetermined angle to the axes of the corrugations of each adjacent sheet, comprising the steps of:

preparing a plurality of flexible corrugated sheets formed of ceramic material and a plurality of burnable support sheets of organic material;

adhering each of said burnable support sheets to each of said flexible corrugated sheets using an adhesive to form units, said each of units including one support sheet and a corrugated sheet lying on the support sheet;

superimposing said units in succession and adhering the same using said adhesive so that the axes of the corrugations of one corrugated sheet are oriented at the predetermined angle to the axes of the corrugations of each adjacent corrugated sheet for thereby forming a flexible assembled structure; and heating said flexible assembled structure at a temperature that will disintegrate said plurality of support sheets and sinter and fuse said plurality of corrugated sheets together to form a unitary honeycomb structure.

7. A method as claimed in claim 6, in which said adhesive is selected from the group consisting of polyvinyl acetate, polyvinyl alcohol, polyvinyl acetal and polyacrylate.

8. A method as claimed in claim 6, in which said adhesive contains said ceramic material.

9. A method as claimed in claim 6, in which said support sheet is selected from a group consisting of a paper containing flax fibers or a synthetic resin.

* * * * *